April 30, 1940.    D. I. CARLSSON    2,199,331
CHANGE SPEED CHAIN AND SPROCKET DRIVE
Filed May 31, 1938    3 Sheets-Sheet 1
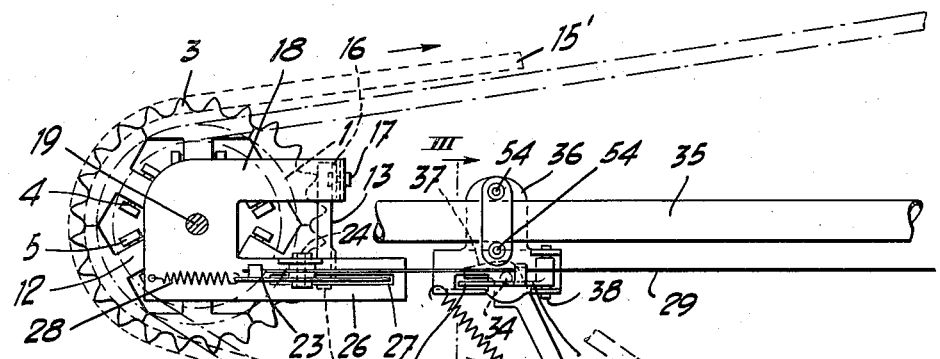
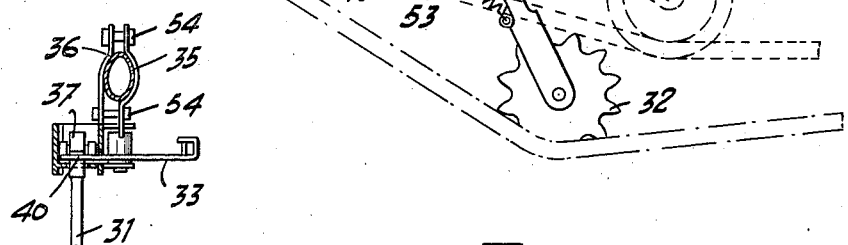
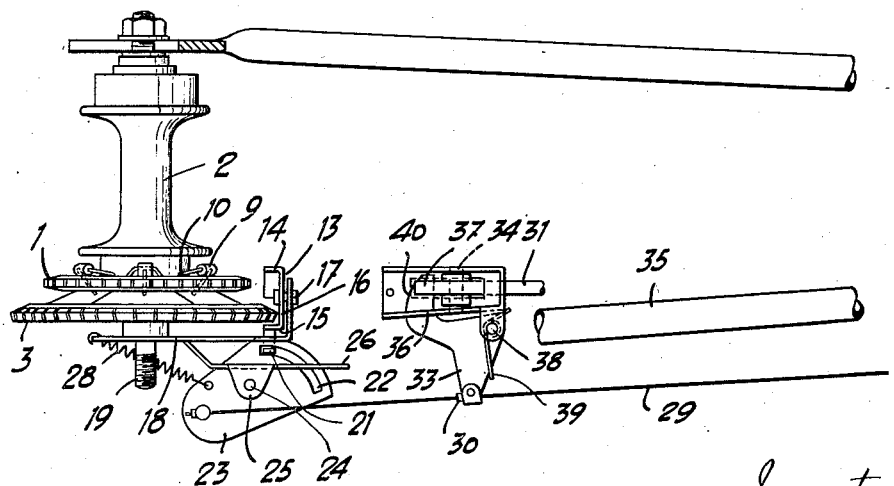
Inventor
David I. Carlsson,
By Sommers & Young
Attys.

April 30, 1940. D. I. CARLSSON 2,199,331
CHANGE SPEED CHAIN AND SPROCKET DRIVE
Filed May 31, 1938   3 Sheets-Sheet 2
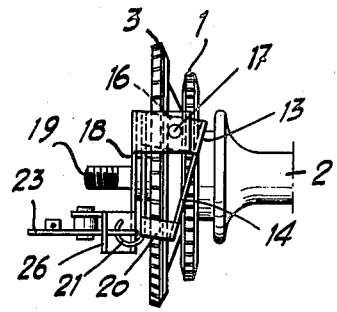
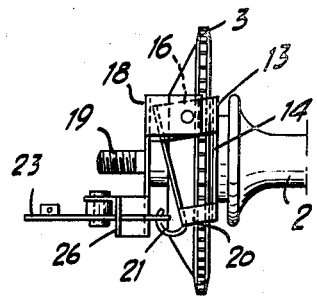
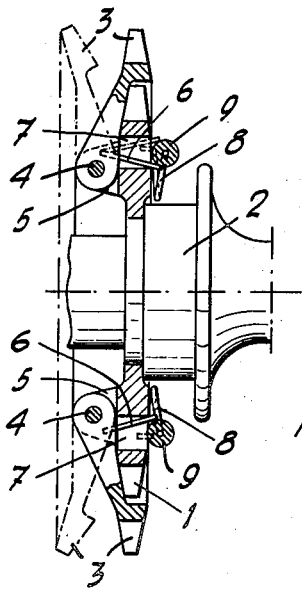
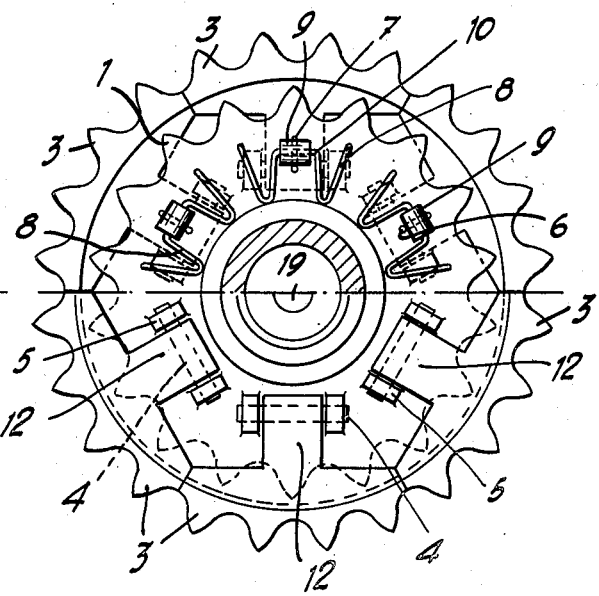
Inventor
David I. Carlsson,
By Sommers & Young
Attys.

April 30, 1940.   D. I. CARLSSON   2,199,331
CHANGE SPEED CHAIN AND SPROCKET DRIVE
Filed May 31, 1938   3 Sheets-Sheet 3
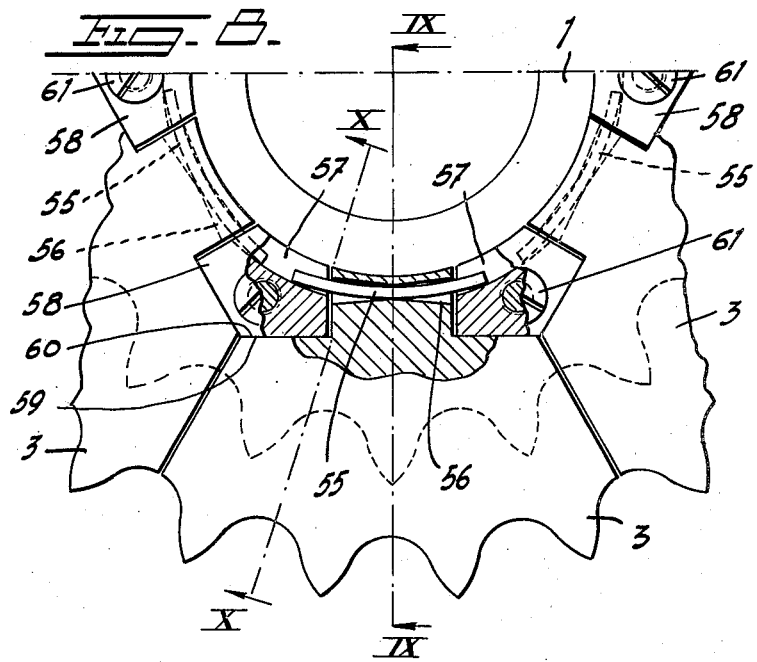
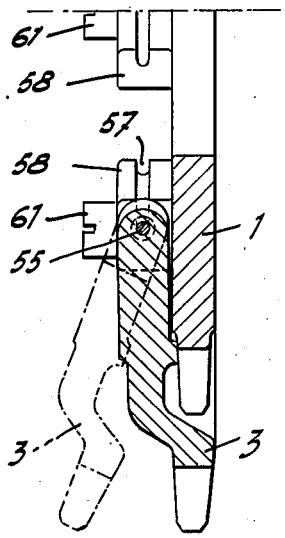
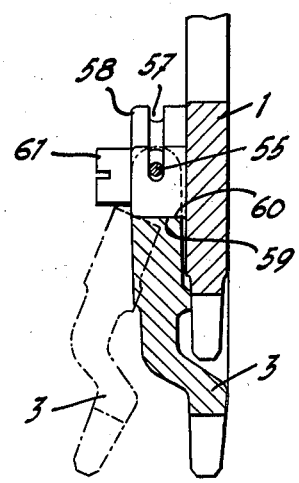
Inventor
David I. Carlsson
By Sommers & Young
Attys.

Patented Apr. 30, 1940

2,199,331

UNITED STATES PATENT OFFICE 2,199,331

CHANGE SPEED CHAIN AND SPROCKET DRIVE

David Ivar Carlsson, Lindesberg, Sweden

Application May 31, 1938, Serial No. 210,978
In Sweden March 16, 1936

2 Claims. (Cl. 74—244)

This invention relates to change speed chain and sprocket drives, particularly for bicycles.

One object of the invention is to provide a drive of the type referred to which by means of a simple manipulation by hand may be changed to a higher or lower gear ratio by the user while riding the bicycle.

Another object of the invention is to provide a variable speed device for bicycles which is of simple and strong design without being heavy and bulky.

Still another object of my invention is to provide a change speed drive which may be installed not only on new bicycles but also on already existing bicycles with slight modification thereof.

Other objects and advantages of my invention will appear from the following description when read in conjunction with the accompanying drawings in which:

Fig. 1 is a side elevation of one embodiment of my improved change speed chain and sprocket drive mounted on the rear axle of a bicycle the rear fork of which is shown partly broken away, the chain being shown diagrammatically in dash-and-dot lines in its ordinary position and in dotted lines with the drive changed to a lower gear ratio.

Fig. 2 is a plan view of the parts illustrated in Fig. 1 with an additional sprocket as used in the present drive situated in its normal inoperative position the chain being omitted.

Fig. 3 is a section taken on line III—III in Fig. 1.

Figs. 4 and 5 are end views of parts of the drive shown in two different positions.

Fig. 6 is a vertical central sectional view of the two sprockets mounted on the rear hub of the bicycle illustrating details of the additional sprocket composed of swingable toothed segments shown in dash-and-dot lines in their inoperative position and in full lines in their operative position.

Fig. 7 is a side elevation partly in section of the elements shown in Fig. 6 with the additional sprocket illustrated in its operative position the top half being viewed from the right and the bottom half from the left in Fig. 6.

Fig. 8 is a fragmentary side elevation partly in section of a modification of the additional sprocket segments.

Figs. 9 and 10 are sections taken on lines IX—IX and X—X respectively in Fig. 8 showing the additional sprocket segments in dash-and-dot lines in inoperative position and in full lines in operative position.

Situated externally of the ordinary sprocket 1 mounted on the rear hub 2 of the bicycle is a series of sprocket segments 3. As may be clearly seen from Figs. 6 and 7 each segment 3 is provided with an apertured lug 12 receiving a pin 4 journalled in apertured lugs of the sprocket 1. The segments 5 normally occupy the inoperative position shown in dash-and-dot lines in Fig. 6 and are adapted to be swung by means of a mechanism fully set forth hereinafter to the operative position shown in full lines in which they form a sprocket ring surrounding the normal sprocket 1. Each segment 3 carries a pin 6 extending through an aperture 7 of the sprocket 1 and adapted to engage the walls of the aperture 7 to stop its associated segment 3 in the two end positions thereof. Situated inside the sprocket 1 are springs 8 each comprising an U-shaped mid portion 10 supporting a roller 9, and bent end portions secured to the sprocket 1. When a segment 3 is swung from the position shown in dash-and-dot lines towards the position shown in full lines its associated pin 6 initially displaces the roller 9 while tensioning the spring 8 and when the pin 6 has passed its mean position the roller 9 is returned by the tensioned spring 8 thereby pressing the pin 6 to its position shown in full lines in Fig. 6. In returning the segments 3 to their inoperative position shown in dash-and-dot lines, of course, similar operations take place. It is thus obvious that in shifting the segments 3 an external force need only be applied to move the segments 3 to a mean or dead centre position from which they are moved by the springs 8 to their operative and inoperative positions.

The shifting of the segments 3 above referred to is effected by means of a deflector generally denoted by 13 which the user when riding the bicycle may shift to decrease or increase the gear ratio as desired. The operative elements of said deflector 13 consist of two guiding members 14 and 15 adapted to cooperate with the internal and external surfaces respectively of the segments 3 while the latter are situated between the upper and lower parts of the chain 15' moving in the direction of the arrow at the top of Fig. 1. In addition, the deflector 13 comprises a base plate 16 pivoted to a support 18 by means of a journal pin, said support being secured to the rear axle 19 of the bicycle. The guiding members 14 and 15 are united by a bridge member 20 (Fig. 4) provided with a curved extension 21 engaging a curved slot 22 of a plate 23 pivoted to a lug 25 by means of a pin 24 said lug projecting from a member 26 in turn projecting from the support 18, the lug 25 being slotted to receive the plate 23. Secured to the support 18 is a spring 28 the opposite end of which is attached to the plate 23.

The deflector 13 is shifted by rotating the plate 23 by means of a cable the metallic cord 29 of which is secured to the plate 23, the opposite end of said cord being secured to a handle (not shown) within easy reach of the rider. Secured to the cord 29 is a member 30 engaging a locking member 33 for a chain tightener 31 supporting a loose sprocket 32 resiliently engaging the chain 15 by means of a spring 53. The chain tightener 31 is pivoted to a support 36 by means of a pin 34, said support being clamped to one leg 35 of the rear fork by means of bolts 54. The locking member 33 is pivoted to the support 36 by means of a pin 38 and is held by a coiled spring 39 in the position shown in Fig. 2 in which an extension 40 thereof engages the bottom surface of a lug 37 of the chain tightener 31 so as to prevent the latter from rotating in counter-clockwise direction in Fig. 1.

In the modification illustrated in Figs. 8–10 the segments 3 are pivoted to the sprocket 1 by special pintle type hinge joints the pintles of which consist of short curved pieces of spring wire 55 extending through bores 56 tapering from both ends to the centre as may be clearly seen from Fig. 8. The ends of the pintles 55 projecting from the bores 56 rest in circumferential recesses 57 at the internal surface of projections 58 from the sprocket 1. The segments 3 are provided with shoulders 59 resting against the surfaces 60 of the projections 58 in the operative position of the segments 3 illustrated in Fig. 8 and in full lines in Figs. 9–10. Secured to the projections 58 are screws 61 serving to stop the segments 3 in their inoperative position illustrated in dash-and-dot in Figs. 9 and 10.

In shifting each segment 3 by a deflector similar to that described in connection with Figs. 1–7, for instance, from the inoperative position towards the operative position the combined pintle and spring 55 is initially slightly tensioned due to the cam action effected by the surface 60 on the surface 59. This tensioning of the spring 55 ceases when the segment 3 is approximately midway between the two extreme positions shown in Fig. 10 and if the segment 3 is moved slightly beyond this middle or dead center position the tensioned spring 55 will shift the segment 3 further to its operative position by approaching the surface 59 to the surface 60. Thus, the segments 3 are positively moved beyond a dead center positioned by the deflector and then snapped to their operative position by the force accumulated in the spring 55 in said positive shifting of the segments 3. The device shown in Figs. 8–10 is thus similar in operation to the device shown in Figs. 6 and 7 but of simpler and more reliable construction.

The operation of the device is as follows:

Ordinarily the chain 15' runs over the sprocket 1 as illustrated in dash-and-dot lines in Fig. 1. If the rider now for any reason desires to reduce the gear ratio he operates the handle above referred to whereby the cord 29 is moved to the right in Fig. 2 so as to rotate the plate 23 counter-clockwise about the pin 24 against the action of the spring 28 whereby the deflector 13, by means of the slot 22 and the extension 21, is rotated about the pin 17 from the position shown in Fig. 4 to the position shown in Fig. 5. In this position of the deflector 13 the toothed segment 3 which at this occasion is situated opposite the deflector 13 is shifted beyond its mean position by means of the guiding member 15 of the deflector 13 and is then moved further by its associated spring 8 in the manner above referred to so as to take up the position shown in full lines in Fig. 6 and engage the returning part of the chain 15' in the continued rotation of the sprocket 1. The remaining rotating segments 3 when engaging the inclined guiding member 15 now situated in their path of movement are then in turn similarly shifted beyond their dead center position and moved to operative position by their associated springs 8 so as to engage the chain 15'. Thus, when all of the segments 3 have been shifted to operative position in the manner above referred to and engage the chain 15' then the latter is running over the toothed ring formed by the shifted segments 3 and encircling the ordinary sprocket 1 now running idly. Consequently the gear ratio has been automatically decreased in response to the simple manipulation of the handle above referred to.

When the cord 29 is moved to the right as above described the member 30 rotates the locking member 33 counter-clockwise in Fig. 2 while tensioning the spring 39 whereby the extension 40 is retracted from its position beneath the lug 37 so as to permit the returning part of the chain 15' to raise the chain tightener 31 to the position shown in dotted lines in Fig. 1 corresponding to the position now occupied by the chain 15' and likewise shown in dotted lines in Fig. 1.

When desired the rider may then restore the ordinary gear ratio by returning the handle above referred to whereby the deflector 13 by means of the guiding member 14 causes the segments 3 to return to inoperative position. The chain then returns to the ordinary sprocket 1 and the chain tightener 31 drops to the position shown in full lines in Fig. 1. Finally the locking member by means of the spring 39 is returned to its operative position with the extension 40 situated beneath the lug 37 of the chain tightener to lock the latter. The drive is now in its original position.

The invention is susceptible of various changes in its form, proportions and minor details of construction and the right is herein reserved to make such changes as properly fall within the scope of the appended claims.

What I claim is:

1. In a change speed chain and sprocket drive for bicycles having a chain and a normal sprocket wheel on the rear axle of the bicycle, a series of additional sprocket segments, pintle-type hinge joints pivoting said segments to said normal sprocket so that the segments are swingable between two extreme positions, said segments in one of said positions being laterally displaced with respect to said chain and in the other of said positions forming together a sprocket ring encircling said normal sprocket and driven by said chain, a deflector for said segments, operating means for moving said deflector, the pintles of said joints consisting of sections of spring wire arranged to move said segment with snap action to either extreme position upon initial shifting of said segments from the opposite extreme position by said deflector under control of the rider.

2. A change speed chain and sprocket drive for bicycles comprising a chain, a normal sprocket on the driving axle of the bicycle, a series of additional sprocket segments, pintle-type hinge joints pivotally connecting said segments to said normal sprocket, said segments being swingable between two extreme positions, said segments in one of said positions being laterally displaced with respect to said chain and in the other of said positions forming together a sprocket ring encircling said normal sprocket and driven by said chain, said segments having bores extending therethrough and tapering smaller from both ends to the center, the pintle of said joints consisting of curved pieces of spring wire mounted in said bores of said segments, both ends of said spring wire pintles projecting from said bores, lugs projecting laterally from said normal sprocket and having recesses, the projecting ends of said pintles extending into said recesses, a deflector for said segments, control means operable by the rider, said lugs having surfaces for exerting a cam action on adjacent surfaces of said segments to tension said spring wire pintles by initiating a shifting of said segments from either extreme position thereof by means of said deflector under control of the rider, the cooperating surfaces of said lugs and segments being shaped to permit said tensioned spring wire pintles to finally shift said segments with snap action to the extreme opposite position thereof.

DAVID IVAR CARLSSON.